United States Patent Office 3,203,886
Patented Aug. 31, 1965

3,203,886
PHOTODIMERIZATION OF MALEIC ANHYDRIDE
Gary Walter Griffin, New Orleans, La., assignor to American Cyanamid Company, Stamford, Conn., a corporation of Maine
No Drawing. Original application Jan. 9, 1961, Ser. No. 81,224, now Patent No. 3,139,395, dated June 30, 1964. Divided and this application Mar. 12, 1964, Ser. No. 351,562
1 Claim. (Cl. 204—158)

This invention relates to a process for the preparation of cis, trans, cis-1,2,3,4-cyclobutanetetracarboxylic acid dianhydride. Still further, this invention relates to a process for the preparation of said dianhydride by dimerizing maleic anhydride by subjecting a solid state layer of maleic anhydride directly to light having a wave length between about 1750 A. and 4000 A.

One of the objects of the present invention is to produce the dianhydride of cis, trans, cis-1,2,3,4-cyclobutanetetracarboxylic acid by a process comprising subjecting a solid state layer of maleic anhydride directly to light having a wave length between about 1750 A. and 4000 A. This and other objects of the present invention will be discussed in greater detail hereinbelow.

An alternative process for the production of the dianhydride of the cis, trans, cis-1,2,3,4-cyclobutanetetracarboxylic acid can be accomplished by the dehydration of the cis, trans, cis-1,2,3,4-cyclobutane tetracarboxylic acid. This dehydration is accomplished with chemical reagents such as acetyl chloride or acetic anhydride or by heating the cis, trans, cis-1,2,3,4-cyclobutanetetracarboxylic acid at temperatures in the vicinity of 225° C. where it loses water rapidly. The period of time required to convert the tetracarboxylic acid to the corresponding dianhydride varies inversely with the temperature selected for the dehydration step. At temperatures around 180° C. the interval for the dehydration may be as much as 24 hours or even longer. At the higher temperatures, however, the time for the dehydration step can be as little as one hour.

In order that the concept of the present invention may be more completely understood, the following example is set forth in which all parts are parts by weight unless otherwise indicated. This example is set forth primarily for the purpose of illustration and any specific enumeration of detail contained herein should not be interpreted as a limitation on the case except as is indicated in the appended claim.

Example

A solution containing 10 parts of maleic anhydride is coated on the inner surface of a glass tube and dried by evaporating the solvent (diethyl ether). The ultraviolet light source was inserted into this tube and irradiation was continued for a period of 10 days. After this, the solid is scraped from the tube and sublimed at .01 mm. The sublimate was collected up to 160° C. and was assumed to be maleic anhydride and was discarded. The dianhydride however sublimed at about 200° C. at 0.01 mm. and weighed 0.9 gram. The product did not melt at 300° C. but simply sublimed. Its IR spectrum shows the characteristic unconjugated anhydride doublet at 5.40 and 5.62, indicating that it is one of the bis-anhydrides of 1,2,3,4-cyclobutanetetracarboxylic acid (anhydride doublet of cis,-cis-3-methylcyclobutane-1,2-dicarboxylic acid at 5.41 and 5.63.

The tetracarboxylic acids and their anhydrides produced according to the process of the present invention may be used in the manufacture of alkyd and polyester resins by reacting the same with a polyhydric alcohol such as glycerol in the case of alkyd resins or a glycol such as ethylene glycol in the case of polyester resins. These alkydes may also be modified by replacing part of the polyols with monohydric alcohols. The methyl esters of these tetracarboxylic acids can be utilized for the same purposes especially where transesterification between the methyl esters and the polyhydric alcohol is desired. The tetracyano derivatives are useful in the production of guanamines by reacting said tetracyano compound with dicyandiamide. The guanamines thus produced are reactive with aldehydes such as formaldehyde to produce aminoplast resinous compositions.

This application is a divisional application of application Serial No. 81,224, filed January 9, 1961, entitled "Photodimerization of Fumaric Acid Derivatives," now U.S. Patent No. 3,139,395.

What is claimed is:
A process for the preparation of the dianhydride of cis, trans, cis-1,2,3,4-cyclobutanetetracarboxylic acid comprising dimerizing by subjecting a solid state layer of maleic anhydride directly to light having a wave length between about 1750 A. and 4000 A.

No references cited.

WINSTON A. DOUGLAS, *Primary Examiner.*